US011333815B1

(12) United States Patent
Ko

(10) Patent No.: US 11,333,815 B1
(45) Date of Patent: May 17, 2022

(54) TRACEABLE FIBER USING SLOTTED LIGHT PIPE AT FAN-OUT KIT OF FIBER OPTICS CABLE

(71) Applicant: Eminent Technologies Company, LLC, San Jose, CA (US)

(72) Inventor: Jamyuen Ko, San Jose, CA (US)

(73) Assignee: Eminent Technologies Company, LLC, San Jose, CA (US)

( * ) Notice: Subject to any disclaimer, the term of this patent is extended or adjusted under 35 U.S.C. 154(b) by 0 days.

(21) Appl. No.: 17/203,820

(22) Filed: Mar. 17, 2021

Related U.S. Application Data

(63) Continuation-in-part of application No. 17/079,560, filed on Oct. 26, 2020.

(51) Int. Cl.
| | | |
|---|---|---|
| *G02B 6/44* | (2006.01) |
| *H04B 10/25* | (2013.01) |
| *F21V 8/00* | (2006.01) |
| *H01B 11/22* | (2006.01) |

(52) U.S. Cl.
CPC ........... *G02B 6/0008* (2013.01); *G02B 6/447* (2013.01); *G02B 6/4472* (2013.01); *H01B 11/22* (2013.01); *H04B 10/25* (2013.01)

(58) Field of Classification Search
None
See application file for complete search history.

(56) References Cited

U.S. PATENT DOCUMENTS

| | | | | |
|---|---|---|---|---|
| 6,906,505 B2* | 6/2005 | Brunet | ................... | G02B 6/447 324/542 |
| 8,314,603 B2* | 11/2012 | Russell | ................ | G02B 6/3895 439/502 |
| 8,909,013 B1* | 12/2014 | Jiang | ...................... | H04B 10/07 385/115 |
| 10,705,307 B2* | 7/2020 | Takeuchi | ............... | H02G 15/02 |
| 2005/0052174 A1* | 3/2005 | Angelo | .............. | H01R 13/7172 324/66 |
| 2017/0123167 A1* | 5/2017 | Isenhour | ............. | G02B 6/3827 |

FOREIGN PATENT DOCUMENTS

DE        19710654 A1 *  9/1998   .............. F02B 77/08

* cited by examiner

*Primary Examiner* — Rhonda S Peace
(74) *Attorney, Agent, or Firm* — Christopher P. Maiorana, PC

(57) ABSTRACT

An apparatus including a first light pipe, a second light pipe and a tracing fiber. The first light pipe may comprise slot features and may be configured to receive light. The second light pipe may comprise the slot features and may be configured to emit the light. The tracing fiber may be configured to propagate the light from the first light pipe to the second light pipe. The first light pipe may focus the light by refraction into the tracing fiber. The slot features of the second light pipe may be configured to scatter the light to provide omnidirectional emission of the light. The tracing fiber may be bundled with one or more data carrying lines in a cable. Each of the data carrying lines may be configured to enable a communication of data. The tracing fiber may be configured to propagate the light without interrupting the communication of data.

20 Claims, 10 Drawing Sheets

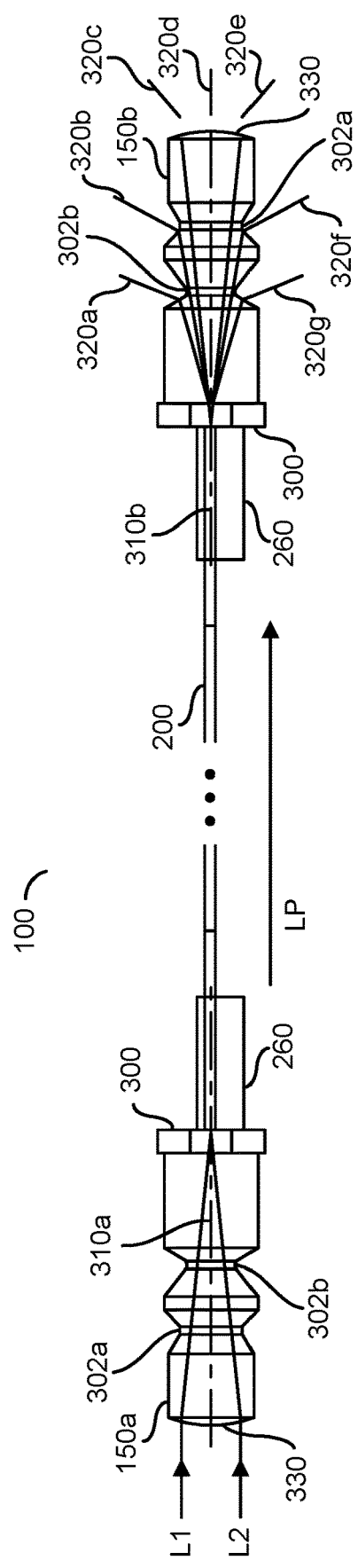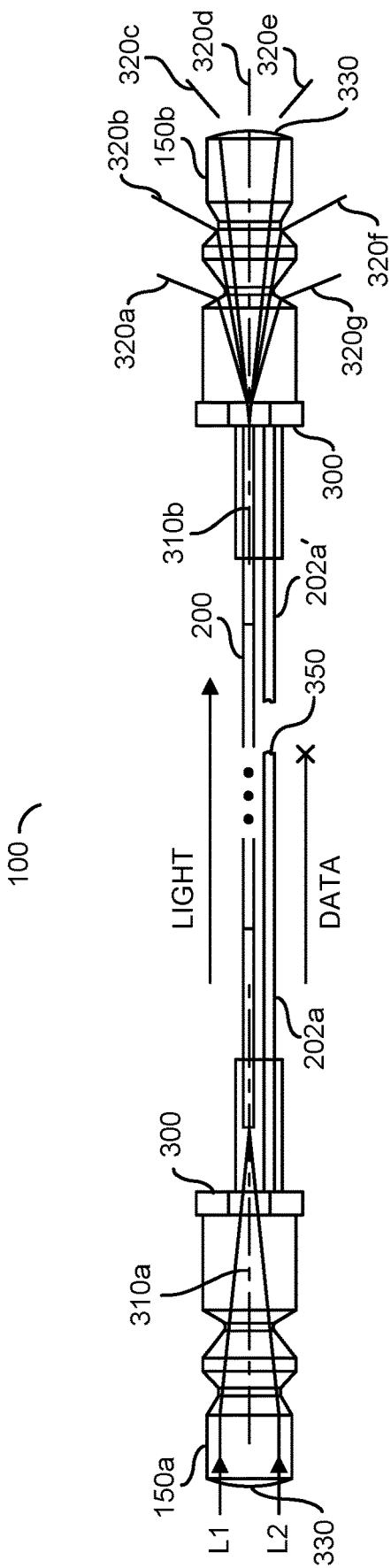

TRACEABLE FIBER USING SLOTTED LIGHT PIPE AT FAN-OUT KIT OF FIBER OPTICS CABLE

This application relates to U.S. application Ser. No. 17/079,560, filed on Oct. 26, 2020, which is hereby incorporated by reference in its entirety.

FIELD OF THE INVENTION

The invention relates to cable management generally and, more particularly, to a method and/or apparatus for implementing a traceable fiber using light pipe at fan-out kit of fiber optics cable.

BACKGROUND

Data centers contain complex infrastructure and interconnections. There can be enormously long cables connecting server blades and switches. Furthermore, there can be an incredible number of long cables routed throughout the data center. Cable management in a data center can be complicated, even when cables are neatly arranged.

Failure ports indicated in a system control station of a data center can indicate that an interconnection has failed. A field technician has to go on-site to locate one of the failure ports and then search for the other end along the engaged cable. The task of tracing a cable from a failure port to the other end might seem easy but is actually time consuming. Because of the number of cables connected to a cabinet of server blades or across cabinets in a data center, tracing cables can be troublesome and tedious. The cables may cross, tangle, and twist between each other making the tracing effort slow. In many scenarios, data cables need to be unplugged to perform tracing. Unplugging data cables may interrupt data communication in the data center.

It would be desirable to implement a traceable fiber using light pipe at fan-out kit of fiber optics cable.

SUMMARY

The invention concerns an apparatus including a first light pipe, a second light pipe and a tracing fiber. The first light pipe may comprise slot features and may be configured to receive light. The second light pipe may comprise the slot features and may be configured to emit the light. The tracing fiber may be configured to propagate the light from the first light pipe to the second light pipe. The first light pipe may focus the light by refraction into the tracing fiber. The slot features of the second light pipe may be configured to scatter the light to provide omnidirectional emission of the light. The tracing fiber may be bundled with one or more data carrying lines in a cable. Each of the data carrying lines may be configured to enable a communication of data. The tracing fiber may be configured to propagate the light without interrupting the communication of data.

BRIEF DESCRIPTION OF THE FIGURES

Embodiments of the invention will be apparent from the following detailed description and the appended claims and drawings.

FIG. 6 is a diagram illustrating light refraction at an input and/or an output of a light pipe.

FIG. 7 is a diagram illustrating light transmission through a light pipe when a data transmission failure is present.

DETAILED DESCRIPTION OF THE EMBODIMENTS

Figure 1:
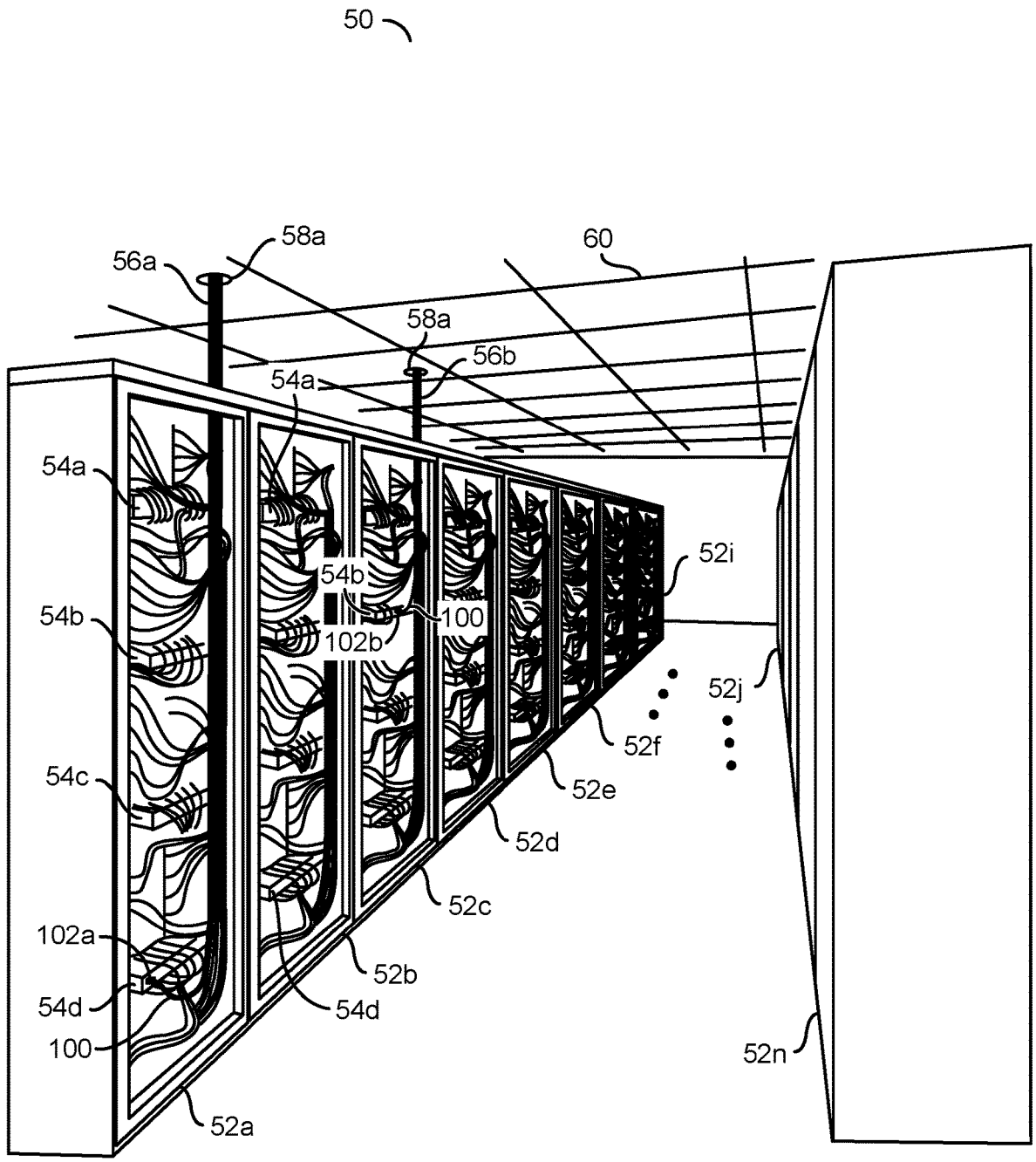
FIG. 1 is a diagram illustrating a context of an embodiment of the present invention.

Embodiments of the present invention include providing a traceable fiber using light pipe at fan-out kit of fiber optics cable that may (i) facilitate tracing a fiber, (ii) provide a protrusion from a fan-out kit, (iii) provide a traceable fiber separated from data fibers, (iv) be implemented in a data center, (v) refract light to emit light omnidirectionally, (vi) fit into a fault locator, (vii) implement strain relief features, (viii) enable tracing of a cable to be performed without interrupting data communication of the cable and/or (ix) be implemented in passive or active cables.

Embodiments of the present invention may be configured to enable and/or facilitate tracing a cable. A fan-out kit assembly may be implemented for a cable. The fan-out kit assembly may comprise a fiber-connected light pipe. In one example, a transparent plastic light pipe may be added to the fan-out kit along with the data connectors. The light pipe may comprise a wavy exterior surface. The wavy exterior surface may enable light refraction to spread light emitted out of the light pipe omnidirectionally.

One light pipe may be implemented at each end of the cable. In an example, one end of a cable may have one fan-out kit and another end of the cable may have another fan-out kit. Each fan-out kit may implement the light pipe. Light may be provided as an input to a light pipe at one end of the cable and be emitted by the light pipe at the other end of the cable. Emitting the light may facilitate tracing the cable.

The light pipes may be connected by an optical fiber. For example, the optical fiber (e.g., a tracing fiber) may run through a cable jacket and connect at the fan-out kit assembly at both ends of a fiber optics cable assembly. The tracing fiber may be implemented as a plastic or glass fiber. The tracing fiber may be an additional fiber implemented inside the raw cable in addition to the data fibers. The fan-out kits at each end of the cable may be configured to separate the tracing fiber from the data fibers. The tracing fiber may be an additional fiber that runs parallel to the data communication fibers within the raw cable jacket.

The tracing fiber may be bundled with data fibers. The tracing fiber may be a separate fiber from the data fibers. The tracing fiber may be configured to propagate light without interrupting the communication of data by the data fibers. For example, the data fibers may not need to be unplugged to trace a cable using the light pipes and the tracing fiber.

In an example, data connectors of one end of a cable may be connected to an input/output port of a telecommunications device and data connectors at another end of the cable may be connected to an input/output port of a second telecommunications device. A technician may shine a light into a light pipe at one end of the cable. The technician may trace the other end of the cable in response to the light emitted by another light pipe implemented at the end of the cable in response to the light input. The light emitted by the other light pipe may provide an indication of the location other end of the cable.

Referring to FIG. 1, a diagram illustrating a context of an embodiment of the present invention is shown. An example location 50 is shown. The location 50 may be a representative example of a data center. The data center 50 may be a facility that houses telecommunications hardware. The data center 50 may be used by a small business, a large business, an internet service provider, a cloud storage and/or cloud processing service, a hosting company, a peering exchange, etc. The type of data center 50 may be varied according to the design criteria of a particular implementation.

The data center 50 shown may comprise a number of server cabinets 52a-52n. The server cabinets 52a-52n may comprise various communications and/or computing hardware. In the example shown, one aisle of server cabinets 52a-52n is shown. The data center 50 may comprise multiple aisles of server cabinets 52a-52n. The data center 50 may comprise hundreds of square feet of various hardware for telecommunications.

The server cabinet 52a is shown comprising telecommunications hardware 54a-54d and a number of cables. The server cabinet 52a may be a representative example of any of the server cabinets 52a-52n. For example, each of the server cabinets 52a-52n may comprise the telecommunications hardware 54a-54d and/or a number of cables. The cables may provide data interconnections between the telecommunications hardware 54a-54d. The cables may provide interconnections between the telecommunications hardware 54a-54d within a single one of the server cabinets 52a-52n and/or interconnections between the telecommunications hardware 54a-54d in multiple different server cabinets 52a-52n. The telecommunications hardware 54a-54d may implement routers, switches, rack servers, server blades, etc. The type of telecommunications hardware 54a-54d installed in the server cabinets 52a-52n may be varied according to the design criteria of a particular implementation.

The cables within the server cabinets 52a-52n are represented as a random arrangement of lines. In some examples, the cables in the data center 50 may be neatly organized (e.g., managed cables). In other examples, the cables in the data center may be unmanaged (e.g., a rat's nest of cabling). While unmanaged cabling creates difficulties in tracing cables for a technician, the number and lengths of the cables in the data center 50 may create difficulties for technicians even in a well managed cable scenario.

An apparatus 100 is shown within the server cabinet 52a. The apparatus 100 may implement a cable. The apparatus 100 may be one of the many cables within the server cabinet 52a. In the example shown, one implementation of the apparatus 100 is illustrated. However, one or more of the cables within the data center 50 may be an implementation of the apparatus 100. The apparatus 100 may comprise light pipes and a tracing fiber to facilitate cable tracing.

One end 102a of the apparatus 100 is shown. The end 102a of the apparatus 100 may be connected to the telecommunications hardware module 54d in the server cabinet 52a. The apparatus 100 may connect the telecommunications hardware module 54d and other telecommunications hardware. For example, the apparatus 100 may enable data transmission between the telecommunications hardware module 54d and another one of the telecommunications hardware modules 54a-54d within one of the server cabinets 52a-52n.

A bundle of cables 56a is shown. The cable bundle 56a is shown partially within the sever cabinet 52a. The cable bundle 56a is shown routed from within the server cabinet 52a and out the top of the server cabinet 52a. The apparatus 100 may be one of the cables of the cable bundle 56a.

The cable bundle 56a is shown routed up into an opening 58a. The opening 58a may be an opening in a ceiling 60 of the data center 50. An opening 58b is shown in the ceiling 60. A bundle of cables 56b is shown dropping cables down from the opening 58b. The bundle of cables 56b may be similar to the cable bundle 56a. The cable bundles 56a-56b may each comprise a different group of cables. While the cable bundles 56a-56b may be described as routing cables up or down, the direction of the cables in each cable bundle 56a-56b may be irrelevant and/or described for illustrative purposes (e.g., data communication may be bi-directional). In an example, the cable bundles 56a-56b may be a form of cable management for routing multiple cables from one location to other locations within the data center 50.

The cable bundle 56b may comprise the apparatus 100. The cable bundle 56b may be partially within the server cabinet 52c. For example, the cable bundle 56b may be routed between the server cabinet 52c and the opening 58b into the ceiling 60. In the example shown, the apparatus 100 may be routed along with the cable bundle 56a out of the server cabinet 52a. Within the ceiling 60, the various cables may be routed towards various directions (not shown). The apparatus 100 may be dropped down from the ceiling 60 as part of the cable bundle 56b and into the server cabinet 52c.

One end 102b of the apparatus 100 is shown. The end 102b of the apparatus 100 may be connected to the telecommunications hardware module 54b in the server cabinet 52c. In the example shown, the apparatus 100 may connect the telecommunications hardware 54d in the server cabinet 52a at the end 102a to the telecommunications hardware 54b in the server cabinet 52c.

The apparatus 100 (and other cables in the data center 50) may be various lengths. In an example, if the apparatus 100 is relatively short (e.g., less than 10 m) a single technician may be capable of tracing the apparatus 100 within the data center 50. However, the apparatus 100 may be longer than 10 m (e.g., hundreds of meters long). The apparatus 100 may be within the cable bundles 56a-56b with multiple other cables. Furthermore, the cable bundles 56a-56b with the apparatus 100 may be routed through inaccessible locations (e.g., in the ceiling 60). For example, the apparatus 100 may be long enough that more than one technician may be needed to trace the apparatus 100. In another example, the apparatus 100 may be traced using a single technician, but the apparatus 100 may be routed through location (e.g., the ceiling 60) that is out of view of the technician.

The apparatus 100 and/or other cables in the data center 50 may be configured to communicate data. The data communication may fail. In one example, the cables may be pinched and/or physically cut. In another example, hardware may fail and/or not operate up to specifications. In yet another example, the hardware modules 54a-54d may need to be replaced and the cables may need to be reconnected to replacement hardware. Tracing the apparatus 100 and/or other cables may be a common activity of technicians in the data center 50. Tracing may be further used during initial cable installation. Tracing may be further used to determine and/or confirm a configuration of the connections of the apparatus 100, while data is being communicated. The apparatus 100 may be configured to transmit light to facilitate the tracing of the apparatus 100 in the data center 50. The light transmitted within the apparatus 100 may enable the apparatus 100 to be distinguished from other of the cables in the data center 50 (e.g., distinguish the apparatus 100 from other cables in the cable bundle 56a and/or the cable bundle 56b).

Figure 2:
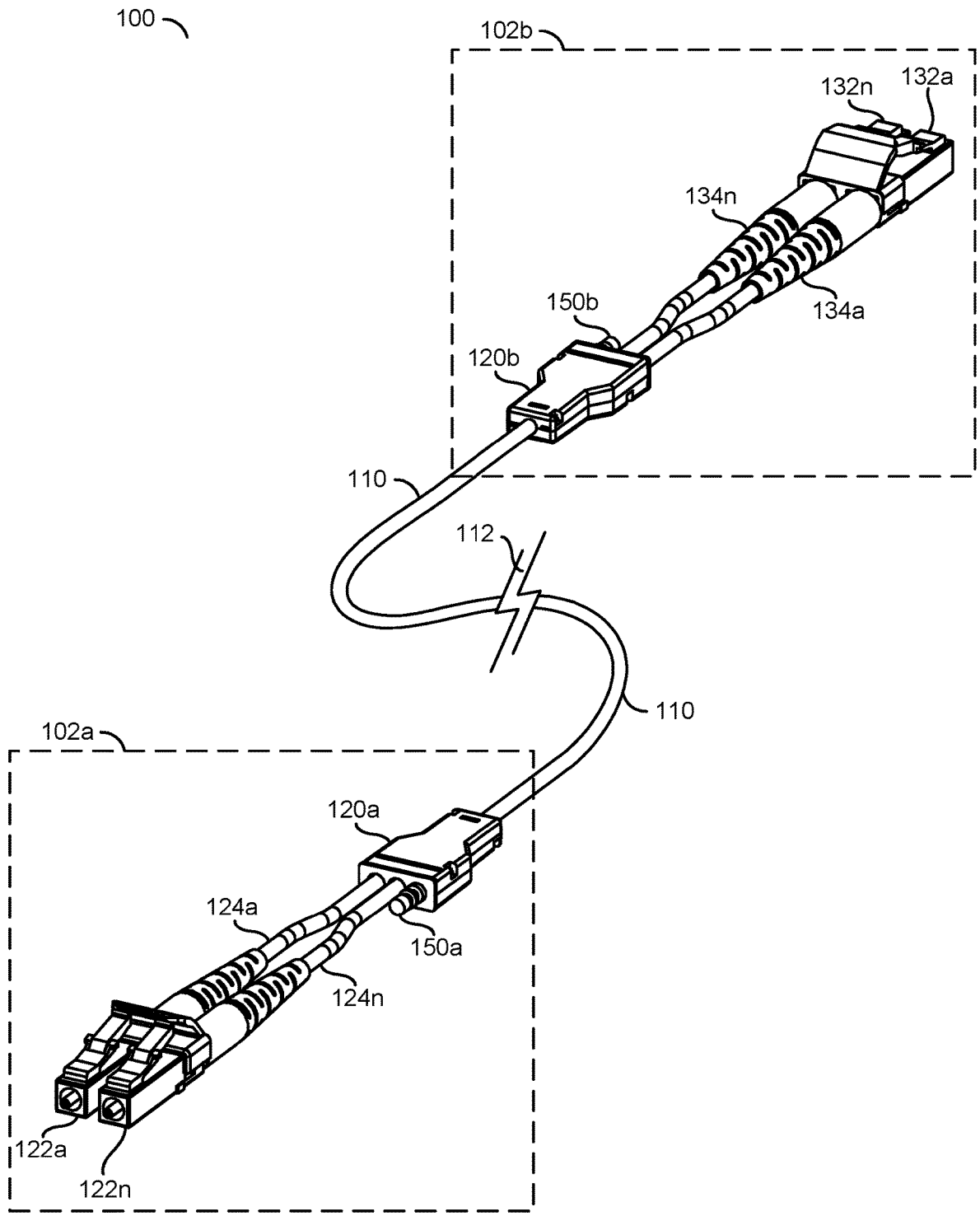
FIG. 2 is a diagram illustrating an example embodiment of the present invention.

Referring to FIG. 2, a diagram illustrating an example embodiment of the present invention is shown. The apparatus 100 is shown. The apparatus 100 may implement a cable. The apparatus 100 may comprise the end 102a and the end 102b as shown in association with FIG. 1. For illustrative purposes, the example shown for the apparatus 100 may be an optical fiber. Embodiments of the apparatus 100 may implement an electrical cable (e.g., HDMI, USB, DisplayPort, etc.).

The apparatus 100 may comprise a cable jacket 110. The cable jacket 110 may be configured to provide protection for the contents of the apparatus 100 (e.g., wires, fibers, etc.). In one example, the cable jacket 110 may be configured to provide electromagnetic shielding. The cable jacket 110 may connect the end 102a to the end 102b of the apparatus 100.

A symbol 112 is shown. The symbol 112 is shown generally in the middle of the cable jacket 110. The symbol 112 may represent an indeterminate length of the cable jacket 110. While the symbol 112 may appear as a discontinuity in the cable jacket 110, the cable jacket 110 may be continuous. In an example where the symbol 112 represents a relatively short length of cable, the apparatus 100 may be a short-run cable (e.g., less than 10 meters). In another example where the symbol 112 represents a relatively long length of cable, the apparatus 100 may be a long-run cable (e.g., 300 meters). The length of the apparatus 100 may be varied according to the design criteria of a particular implementation.

The cable jacket 110 may comprise passive interconnections and/or active interconnections. The cable jacket 110 may comprise wires and/or fibers. In one example, the cable jacket 110 may contain copper wiring. In another example, the cable jacket 110 may contain plastic fibers. In yet another example, the cable jacket 110 may contain glass fibers. The type of material used to communicate using the apparatus 100 may be varied according to the design criteria of a particular implementation.

The end 102a of the apparatus 100 may comprise a fan-out kit 120a. The fan-out kit 120a may be connected to the cable jacket 110. Input/output connectors 122a-122n are shown. Input/output cable jackets 124a-124n are shown extending from the fan-out kit 120a. The I/O cable jackets 124a-124n may be connected to (terminated at) the I/O connectors 122a-122n. In the example shown, the I/O connectors 122a-122n may be an LC connector format. In another example, the I/O connectors 122a-122n may be an FC connector format. In yet another example, the I/O connectors 122a-122n may be an SC connector format. In yet another example, the I/O connectors 122a-122n may be an ST connector format. In still another example, the I/O connectors 122a-122n may be an MPO format. The format of the I/O connectors 122a-122n may be varied according to the design criteria of a particular implementation.

The I/O connectors 122a-122n and the I/O cable jackets 124a-124n may communicate data to/from the fan-out kit 120a. The fan-out kit 120a may be configured to separate wires/fibers carried by the cable jacket 110 to distinct inputs/outputs as the I/O connectors 122a-122n and the I/O cable jackets 124a-124n. In the example shown, the fan-out kit 120a may implement a 2-to-1 fan-out kit (e.g., two cables at one end and one cable on the other end of the fan-out kit 120a). The fan-out kit 120a may be configured to separate out any number of data connections. The number of I/O connectors 122a-122n and/or I/O cable jackets 124a-124n connected to the fan-out kit 120a may be varied according to the design criteria of a particular implementation.

The end 102b of the apparatus 100 may have a similar implementation as the end 102a. The end 102b of the apparatus 100 may comprise a fan-out kit 120b. The fan-out kit 120b may be connected to the cable jacket 110. Input/output connectors 132a-132n are shown. Input/output cable jackets 134a-134n are shown extending from the fan-out kit 120b. The I/O cable jackets 134a-134n may be connected to (terminated at) the I/O connectors 132a-132n. In the example shown, the I/O connectors 132a-132n may be an LC connector format. Similar to the I/O connectors 122a-122n, the I/O connectors 132a-132n may implement various connector formats (e.g., FC SC, ST, MPO, etc.). The format of the I/O connectors 122a-122n and the I/O connectors 132a-132n may be the same or different.

The I/O connectors 132a-132n and the I/O cable jackets 134a-134n may communicate data to/from the fan-out kit 120b. The fan-out kit 120b may be configured to separate wires/fibers carried by the cable jacket 110 to distinct inputs/outputs as the I/O connectors 132a-132n and the I/O cable jackets 134a-134n. In the example shown, the fan-out kit 120b may implement a 2-to-1 fan-out kit (e.g., two cables at one end and one cable on the other end of the fan-out kit 120b). The fan-out kit 120b may be configured to separate out any number of data connections. The number of I/O connectors 132a-132n and/or I/O cable jackets 134a-134n connected to the fan-out kit 120b may be varied according to the design criteria of a particular implementation.

The fan-out kits 120a-120b may be connected at each end 102a-102b of the cable jacket 110. In the example shown, the number of I/O connectors 122a-122n and I/O cable jackets 124a-124n implemented by the fan-out kit 120a may match the number of I/O connectors 132a-132n and I/O cable jackets 134a-134n implemented by the fan-out kit 120b. In some embodiments, the number of I/O connectors 122a-122n and I/O cable jackets 124a-124n implemented by the fan-out kit 120a may not necessarily match the number of I/O connectors 132a-132n and I/O cable jackets 134a-134n implemented by the fan-out kit 120b (e.g., a 8xLC connector at one end and a 1xMPO (ribbon cable) at another end). The I/O connectors 122a-122n and the I/O connectors 132a-132n may connect to the telecommunication hardware 54a-54d shown in association with FIG. 1. For the example shown in association with FIG. 1, the connectors 122a-122n at the end 102a of the cable 100 may connect to the telecommunications hardware 54d in the server cabinet 52a and the connectors 132a-132n at the end 102b of the cable 100 may connect to the telecommunications hardware 54b in the server cabinet 52c.

The fan-out kit 120a may comprise a light pipe 150a. The fan-out kit 120b may comprise a light pipe 150b. The light pipes 150a-150b may be connected to a tracing fiber that runs through the cable jacket 110 between the fan-out kits 120a-120b. In an example, the fan-out kit 120a may provide connections to any number of the I/O cable jackets 124a-124n and comprise the single light pipe 150a. Similarly, the fan-out kit 120b may provide connections to any number of the I/O cable jackets 134a-134n and comprise the single light pipe 150b. Each of the fan-out kits 120a-120b may comprise a single light pipe (e.g., the light pipes 150a-150b, respectively) regardless of the number of the number of data connections implemented by the fan-out kits 120a-120b.

The light pipes 150a-150b may be configured to receive and/or emit light. The light pipes 150a-150b may be configured to enable tracing of the apparatus 100 using a light input. In one example, light may be input at the cable end 102a using the light pipe 150a and the light may be output at the cable end 102b using the light pipe 150b. In another example, light may be input at the cable end 102b using the light pipe 150b and the light may be output at the cable end 102a using the light pipe 150a. The light input may propagate between the light pipes 150a-150b regardless of the length of the cable jacket 110. The emission of the light out of one of the light pipes 150a-150b may enable a person (e.g., a technician) to locate the opposite one of the ends 102a-102b of the apparatus 100 when shining the light into one of the light pipes 150a-150b.

Figure 3:
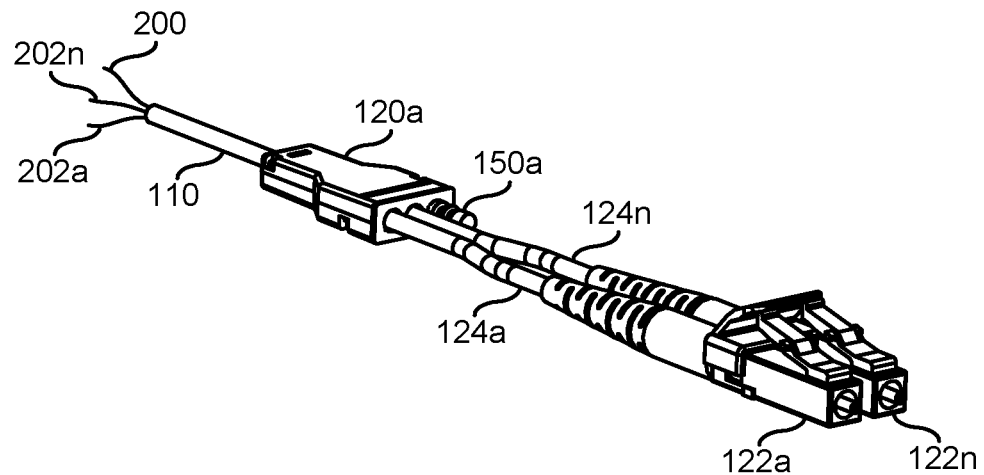
FIG. 3 is a diagram illustrating wires/fibers of an example embodiment of the present invention.

Referring to FIG. 3, a diagram illustrating wires/fibers of an example embodiment of the present invention is shown. A view of the end 102a of the apparatus 100 is shown. The end 102a may comprise the fan-out kit 120a, the I/O connectors 122a-122n, the I/O cable jackets 124a-124n and/or the light pipe 150a. The cable jacket 110 is shown extending from the fan-out kit 120a opposite from the I/O cable jackets 124a-124n and the light pipe 150a.

In the example shown, a cutaway view of the cable jacket 110 is shown. The cutaway view may show transmission lines implemented within the cable jacket 110. The cable jacket 110 may comprise a transmission line 200 and/or transmission lines 202a-202n (e.g., data carrying lines). The transmission line 200 may comprise a tracing line (e.g., a tracing fiber). The transmission lines 202a-202n may comprise data lines (e.g., data fibers or wires). When the apparatus 100 is connected, the tracing fiber 202 and the data lines 202a-202n may be contained within the cable jacket. In the example shown, two data lines 202a-202n may be implemented. The number of data lines 202a-202n implemented may be varied according to the design criteria of a particular implementation.

The tracing fiber 200 and the data lines 202a-202n may run through the cable jacket 110 between the fan-out kits 120a-120b. The tracing fiber 200 may be connected to the light pipe 150a. The data lines 202a-202n may be connected to a respective one of the I/O cable jackets 124a-124n and may be terminated at a respective one of the I/O connectors 122a-122n.

In some embodiments, the data lines 202a-202n may comprise copper wires. For example, the cable jacket 110 may implement an Ethernet cable. The data lines 202a-202n may comprise twisted pairs of copper wires to transmit data. The tracing fiber 200 may implement an optical fiber. In some embodiments, the tracing fiber and the data lines 202a-202n may comprise optical fibers. In another example, the cable jacket 110 may implement an HDMI cable, a USB cable, a DisplayPort cable, etc. The type of communication medium used for the data lines 202a-202n and/or the communications protocol used by the data lines 202a-202n may be varied according to the design criteria of a particular implementation.

The fan-out kit 120a may be configured to separate the tracing fiber 200 and the data lines 202a-202n and/or bundle the tracing fiber 200 and the data lines 202a-202n. At the end of the fan-out kit 120a connected to the cable jacket 110, the fan-out kit 120a may bundle the tracing fiber 200 and the data lines 202a-202n to fit within the cable jacket 110. Within the fan-out kit 120a, the bundle of transmission lines received from the cable jacket 110 may be separated to the appropriate output port (e.g., the tracing fiber 200 to the light pipe 150a, the data line 202a to the I/O cable jacket 124a, the data line 202n to the I/O cable jacket 124n, etc.).

Figure 4:
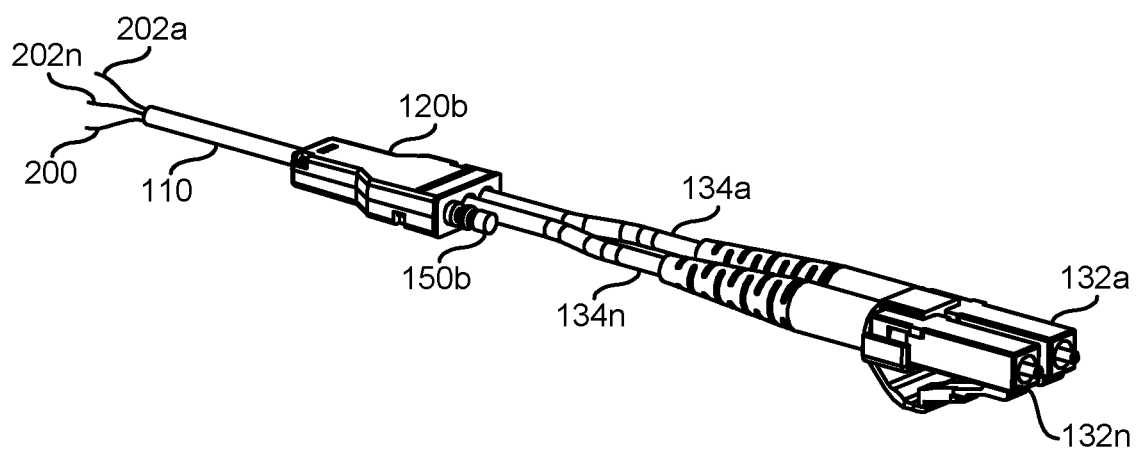
FIG. 4 is a diagram illustrating a view of a light pipe connected to a fan-out kit.

Referring to FIG. 4, a diagram illustrating a view of a light pipe connected to a fan-out kit is shown. A view of the end 102b of the apparatus 100 is shown. The end 102b may comprise the fan-out kit 120b, the I/O connectors 132a-132n, the I/O cable jackets 134a-134n and/or the light pipe 150b. The cable jacket 110 is shown extending from the fan-out kit 120b opposite from the I/O cable jackets 134a-134n and the light pipe 150b.

In the example shown, a cutaway view of the cable jacket 110 is shown. The cutaway view may show transmission lines implemented within the cable jacket 110. Similar to the cutaway view shown in association with FIG. 3, the cable jacket 110 may comprise the tracing fiber 200 and/or the data lines 202a-202n. For example, the end 102a shown in association with FIG. 3 may comprise one end of the tracing fiber 200 and/or the data lines 202a-202n, and the end 102b shown in association with FIG. 4 may comprise the other end of the same tracing fiber 200 and/or the data lines 202a-202n.

The tracing fiber 200 and the data lines 202a-202n may run through the cable jacket 110 between the fan-out kits 120a-120b. The tracing fiber 200 may be connected to the light pipe 150b. The data lines 202a-202n may be connected to a respective one of the I/O cable jackets 134a-134n and may be terminated at a respective one of the I/O connectors 132a-132n.

The fan-out kit 120b may be configured to separate the tracing fiber 200 and the data lines 202a-202n and/or bundle the tracing fiber 200 and the data lines 202a-202n. At the end of the fan-out kit 120b connected to the cable jacket 110, the fan-out kit 120b may bundle the tracing fiber 200 and the data lines 202a-202n to fit within the cable jacket 110. Within the fan-out kit 120b, the bundle of transmission lines received from the cable jacket 110 may be separated to the appropriate output port (e.g., the tracing fiber 200 to the light pipe 150b, the data line 202a to the I/O cable jacket 134a, the data line 202n to the I/O cable jacket 134n, etc.).

The data lines 202a-202n may be configured to carry communications data to/from the I/O connectors 122a-122n and the I/O connectors 132a-132n. The tracing fiber 200 may be configured to propagate a light input to/from the light pipe 150a and the light pipe 150b. In one example, data received by the I/O connectors 122a-122n may be transmitted to the I/O connectors 132a-132n by the data lines 202a-202n within the cable jacket 110. In a similar example, data received by the I/O connectors 132a-132n may be transmitted to the I/O connectors 122a-122n by the data lines 202a-202n within the cable jacket 110. In another example, light input received by the light pipe 150a may be propagated through the tracing fiber 200 within the cable jacket 110 and emitted by the light pipe 150b. In a similar example, light input received by the light pipe 150b may be propagated through the tracing fiber 200 within the cable jacket 110 and emitted by the light pipe 150a.

The tracing fiber 200 may be configured to transfer light between the light pipes 150a-150b regardless of whether the data lines 202a-202n are transmitting data. For example, the light pipes 150a-150b may be operational even when the I/O connectors 122a-122n and/or the I/O connectors 132a-132n are unplugged. The light pipes 150a-150b and the tracing fiber 200 may enable the tracing of a cable to be performed without unplugging the I/O connectors 122a-122n and/or the I/O connectors 132a-132n.

Figure 5:
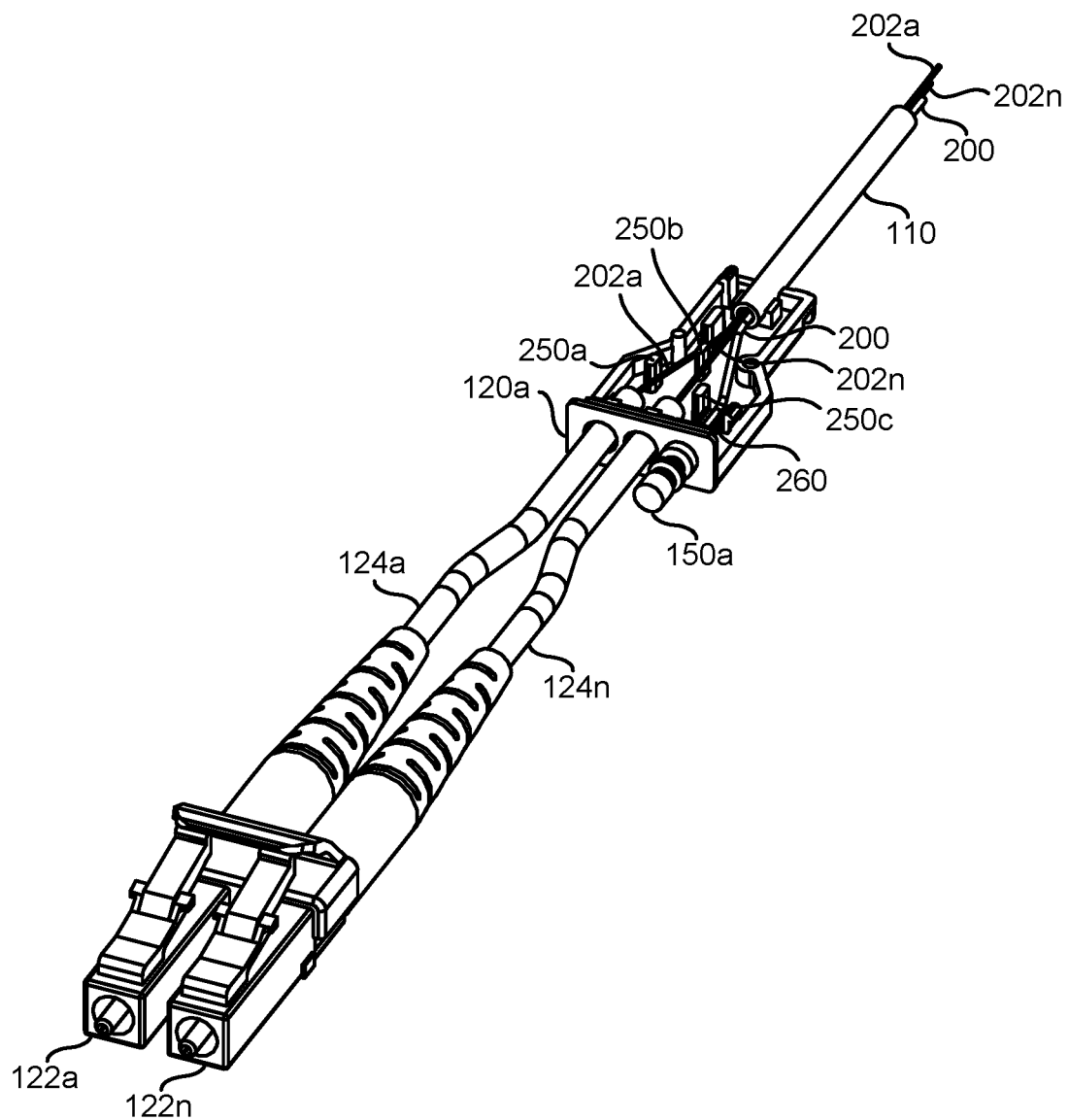
FIG. 5 is a diagram illustrating an internal view of a fan-out kit.

Referring to FIG. 5, a diagram illustrating an internal view of a fan-out kit is shown. The fan-out kit 120a is shown as a representative example. The internal view of the fan-out kit 120b may be similar to the fan-out kit 120a shown. The fan-out kit 120a is shown connected to the cable jacket 110. The tracing fiber 200 and the data lines 202a-202n are shown within the cable jacket 110. The I/O connectors 122a-122n and the I/O cable jackets 124a-124n are shown connected to the fan-out kit 120a. The light pipe 150a is shown connected to the fan-out kit 150. In the example shown, the fan-out kit 120a may be a 2-to-1 fan-out kit (e.g., the cable jacket 110 may be separated out to two of the I/O connectors 122a-122n and the I/O cable jackets 124a-124n). However, a fan-out kit connected to more (or less) than two of the I/O connectors 122a-122n and the I/O cable jackets 124a-124n may be implemented.

The tracing fiber 200 and the data lines 202a-202n are shown separated within the fan-out kit 120a. For example, the tracing fiber 200 and the data lines 202a-202n may extend beyond the cable jacket 110 at the fan-out kit 120a. The fan-out kit 120a may be configured to route the tracing fiber 200 to the light pipe 150a. The fan-out kit 120a may be configured to route the data lines 202a-202n (e.g., provide a path) to the respective I/O cable jackets 124a-124n.

The fan-out kit 120a may comprise strain relief features 250a-250c. The strain relief features 250a-250c are shown near the tracing fiber 200 and the data lines 202a-202n. The strain relief features 250a-250c may be molded to a housing of the fan-out kit 120a. In an example, the housing of the fan-out kit 120a may be a plastic material. The strain relief features 250a-250c may comprise the same material (e.g., plastic) as the housing of the fan-out kit 120a. In some embodiments, a fabric may be wrapped around the strain relief features 250a-250c. In one example, the strain relief features 250a-250c may be wrapped in a kevlar fabric. The kevlar fabric wrapped around the strain relief features 250a-250c may be configured to prevent excessive stress and/or limit an amount of stress applied onto fibers (e.g., the tracing fiber 200 and the data lines 202a-202n) during cable stretch (or bending).

The fan-out kit 120a may comprise a groove 260. The groove 260 may lead the tracing fiber 200 to the light pipe 150a. A front end of the light pipe 150a may be exposed to the exterior of the fan-out kit 120a. The rest of the light pipe 150a may be mounted within the housing of the fan-out kit 120a. The tracing fiber 200 may be glued onto the light pipe to enable light collection and/or propagation.

The light pipe 150a is shown extending from the fan-out kit 120a. The light pipe 150a may comprise a protrusion. For example, the protrusion of the light pipe 150a may be a nipple and/or a nub. The protrusion of the light pipe 150a from the fan-out kit 120a may enable the light pipe 150a to fit into a device (e.g., a fault locator). The protrusion of the light pipe 150a may facilitate shining a light into the light pipe 150a without first disconnecting the I/O connectors 122a-122n. The light pipe 150b of the fan-out kit 120b may have a similar protrusion implementation.

If light is shone onto the light pipe 150a at one end (e.g., the end 102a) of the cable assembly 100, the light may be focused by the light pipe 150a into the tracing fiber 200 by refraction. The light may propagate through the tracing fiber 200. The light may be emitted from the light pipe 150b mounted at the other end (e.g., the end 102b) of the cable assembly 100. The tracing feature enabled by the light pipes 150a-150b and the tracing fiber 200 may reduce an amount of time taken by technicians when locating both ends of the cable assembly 100.

Referring to FIG. 6, a diagram illustrating light refraction at an input and/or an output of a light pipe is shown. A view of a portion of the apparatus 100 is shown. The light pipe 150a and the light pipe 150b are shown at each end of the apparatus 100. The tracing fiber 200 is shown connected between the light pipes 150a-150b. For clarity, the fan-out kits 120a, the I/O connectors 122a-122n, the I/O cable jackets 124a-124n, the I/O connectors 132a-132n and the I/O cable jackets 134a-134n have been omitted.

A surface 300 is shown connected to the light pipe 150a. Another implementation of the surface 300 is shown connected to the light pipe 150b. The surface 300 may be a stop surface. The stop surface 300 may be perpendicular to the tracing fiber 200. An implementation of the groove 260 may be attached to (e.g., molded to) each implementation of the stop surface 300. The tracing fiber 200 is shown routed through the groove 260.

The light pipes 150a-150b are each shown comprising a number of slot features 302a-302b. The slot features 302a-302b may be implemented along the perimeter of each of the light pipes 150a-150b. In the example shown, the slot features 302a-302b may have a saw tooth shaped pattern. In another example, the slot features 302a-302b may be a rectangular shaped pattern. In yet another example, the slot features 302a-302b may be a square shaped pattern. In the example shown, the light pipes 150a-150b may have two of the slot features 302a-302b. The light pipes 150a-150b may have more or fewer of the slot features 302a-302b. The number, size and/or shape of the slot features 302a-302b may be varied according to the design criteria of a particular implementation. A line 310a is shown through the light pipe 150a and the tracing fiber 200. The line 310a may be a reference line representing a center line of the light pipe 150a. A line 310b is shown through the light pipe 150b and the tracing fiber 200. The line 310b may be a reference line representing a center line of the light pipe 150b.

Lines L1 and L2 are shown directed into the light pipe 150a. The lines L1-L2 may represent a light input. The light L1-L2 may be shone into the light pipe 150a. The light pipe 150a may be configured to collect (e.g., focus) the light input L1-L2 (e.g., by refraction). The light input L1-L2 may be collected by the light pipe 150a into the tracing fiber 200.

The light input L1-L2 focused into the tracing fiber 200 may propagate through the tracing fiber 200. A line LP is shown alongside the tracing fiber 200. The line LP may represent the direction of propagation of the light input L1-L2. The tracing fiber 200 may be configured to propagate the light input L1-L2 from the end 102a to the end 102b of the apparatus 100. The tracing fiber 200 may present the light input L1-L2 to the light pipe 150b.

The light pipe 150b may receive the light input L1-L2 resulting from the propagation LP through the tracing fiber 200. Lines 320a-320g are shown extending from the light pipe 150b. The lines 320a-320g may represent the light emitted by the light pipe 150b. The emitted light 320a-320g may be output by the light pipe 150b in response to receiving the light input L1-L2 propagated through the tracing fiber 200.

Some light L1-L2 received at the light pipe 150b may be emitted out from the slot features 302a-302b. The slot features 302a-302b may cause the light to bounce because of total reflection. In the example shown, the light emission 320a and the light emission 320g are shown output through the slot feature 302b and the light emission 320b and the light emission 320f are shown output through the slot feature 302a. The light that hits the slot features 302a-302b may be refracted out of the light pipe 150b. The slot features 302a-302b may enable omnidirectional output of the output light 320a-320g at the light pipe 150b.

The light pipes 150a-150b may have a circular (e.g., rounded) exterior surface. The circular surface of the light pipes 150a-150b may be frosted (or diffused). The frosted circular surface of the light pipes 150a-150b may help scatter output light. The light may hit the cylindrical exterior diffused surface to be diffused out of the light pipe 150b. The scattering caused by the frosted surface may enable the light output 320a-320g at the light pipe 150b to be omnidirectional. An omnidirectional light output may help technicians trace the cable end of the apparatus 100.

The light pipes 150a-150b may each comprise a lens surface 330. The lens surface 330 may be implemented as the outward face of the light pipes 150a-150b. The lens surface 330 may help focus the input light L1-L2. The input light L1-L2 focused by the lens surface 330 may enable focus by refraction. The refracted light may be focused into the tracing fiber 200. The tracing fiber 200 may be glued to the light pipes 150a-150b. The input light L1-L2 focused into the fiber 200 may propagate (e.g., in the propagation direction LP) to the other end of the tracing fiber 200 to be emitted from the light pipe 150b.

Referring to FIG. 7, a diagram illustrating light transmission through a light pipe when a data transmission failure is present is shown. A view of a portion of the apparatus 100 is shown. The view of a portion of the apparatus 100 may be similar to the example shown in association with FIG. 6. The light pipe 150a and the light pipe 150b are shown at each end of the apparatus 100. The tracing fiber 200 is shown connected between the light pipes 150a-150b. The stop surface 300 is shown attached to the light pipes 150a-150b. The reference center line 310a-310b is shown. The light input L1-L2 is shown being focused by the light pipe 150a. The emitted light 320a-320g is shown output from the light pipe 150b.

An example of a data line 202a-202a' (e.g., comprising a data line portion 202a and a data line portion 202a') is shown along with the tracing fiber 200. The data line 202a-202a' may be a representative example of any of the data lines 202a-202n within the cable jacket 110. The data line 202a-202a' is shown running parallel to the tracing fiber 200. The data line 202a-202a' may be separate from the tracing fiber 200.

A discontinuity 350 is shown in the data line 202a-202a'. In one example, the discontinuity 350 may be a physical break in the data line 202a-202a' (e.g., the fiber may have been cut). In another example, the discontinuity 350 may represent a loss of communication of the data transmitted by the data line 202a-202a' and/or a decrease in performance of the data line 202a-202a' (e.g., the data line 202a-202a' may be dropping packets and/or communicating at a lower throughput than specified). In yet another example, the break 350 may represent an error in the telecommunications hardware 54a-54d (e.g., a hardware failure that prevents the communication of the data, one of the I/O connectors 122a-122n and/or the I/O connectors 132a-132n are disconnected). The type of fault that prevents data transmission may be varied according to a particular operating scenario.

A signal (e.g., LIGHT) is shown communicated by the tracing fiber 200. The signal LIGHT may represent the propagation of the light L1-L2 through the tracing fiber 200. The signal LIGHT may be transmitted from the light pipe 150a to the light pipe 150b. The signal LIGHT may be emitted from the light pipe 150b as the scattered light 320a-320g.

A signal (e.g., DATA) is shown communicated by the data line 202a. The signal DATA may represent data communications transmitted by the data lines 202a-202n. In the example shown, the signal DATA may be transmitted through the data line 202a up until reaching the break 350. The break 350 may prevent the signal DATA from continuing through the data line portion 202a'. For example, the signal DATA intended to be sent from the end 102a of the apparatus 100 may not reach the end 102b.

The signal DATA may communicate computer readable data. The signal LIGHT may not communicate computer readable data. For example, the signal LIGHT may be viewed by a person. The light pipes 150a-150b and the tracing fiber 200 communicating the signal LIGHT may operate independent from the data lines 202a-202n, the I/O connectors 122a-122n and the I/O connectors 132a-132n communicating the signal DATA.

Even if one of the data lines 202a-202n has the break 350, the signal LIGHT may still propagate through the tracing fiber 200. For example, even if one or more of the data lines 202a-202n carrying data physically breaks, as long as tracing fiber 200 is not cut, the light signal LIGHT may still propagate from one end 102a to the other end 102b of the apparatus 100. The tracing fiber 200 may be a physically separate fiber from any of the data lines 202a-202n.

While the example shown provides an example scenario with the break 350, tracing the apparatus 100 using the light input L1-L2 may be performed even while the data lines 202a-202n are communicating the data. For example, the light input may be presented to and propagated by the tracing fiber 200 without interrupting the communication of the signal DATA. For example, the light input L1-L2 may be presented to the light pipe 150a while the I/O connectors 122a-122n are plugged into one of the telecommunication hardware modules 54a-54d and while the I/O connectors 132a-132n are connected to one of the telecommunication hardware modules 54a-54d. For example, the light pipes 150a-150b may be accessible and operational without unplugging either end 102a-102b of the apparatus 100.

Figure 8:
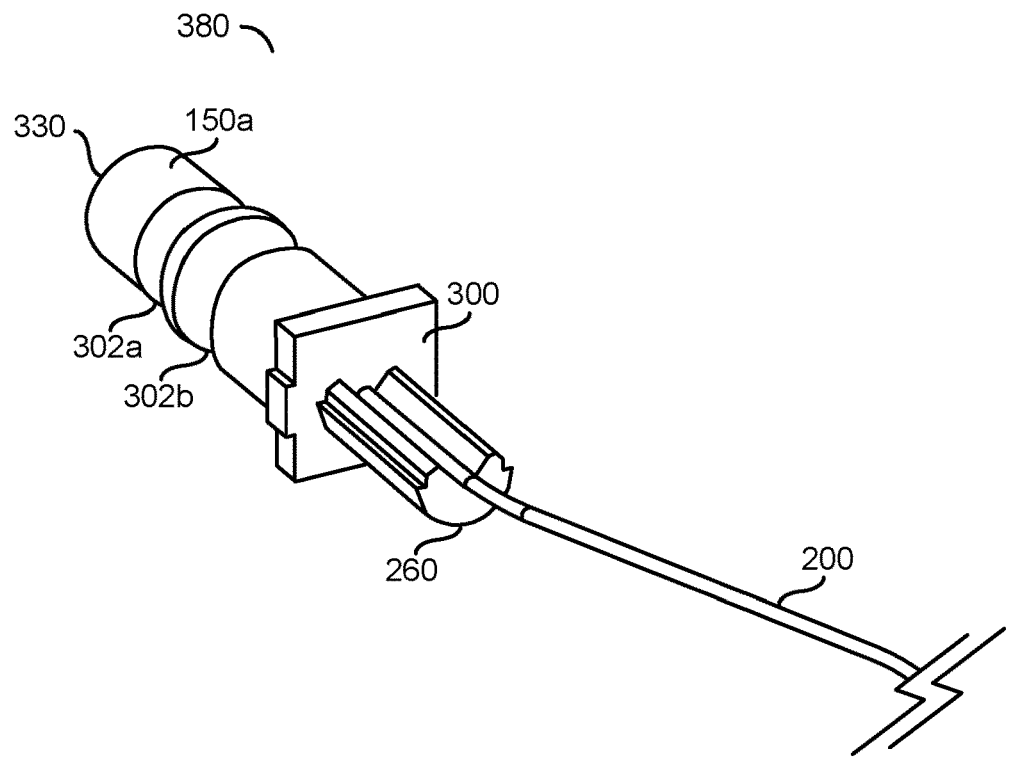
FIG. 8 is a diagram illustrating a stop surface and v-groove connected to a light pipe.

Referring to FIG. 8, a diagram illustrating a stop surface and v-groove connected to a light pipe is shown. A view 380 of the end 102a is shown. The view 380 may comprise the light pipe 150a connected to the tracing fiber 200. The view 380 may illustrate how the tracing fiber 200 may be attached to the light pipe 150a. While the view 520 provides an example of the light pipe 150a, the end 102b with the light pipe 150b may have a similar implementation.

The slot features 302a-302b are shown implemented by the light pipe 150a. A back end of the light pipe 150a is shown comprising the groove 260. The groove 260 may implement a long v-groove. The v-groove 260 may be implemented for alignment of the tracing fiber 200. The v-groove 260 may further provide a surface for glue attachment of the tracing fiber 200.

The light pipe 150a may comprise the lens surface 330 at one end (e.g., a front face) and the stop surface 300 at another end (e.g., a back end). The lens surface 330 may focus the input light. The stop surface 300 may be a focal plane where the light input converges. The light may converge at the stop surface 300 and into the tracing fiber 200.

The stop surface 300 may serve as a hard stop mechanical position of the tracing fiber 200.

Figure 9:
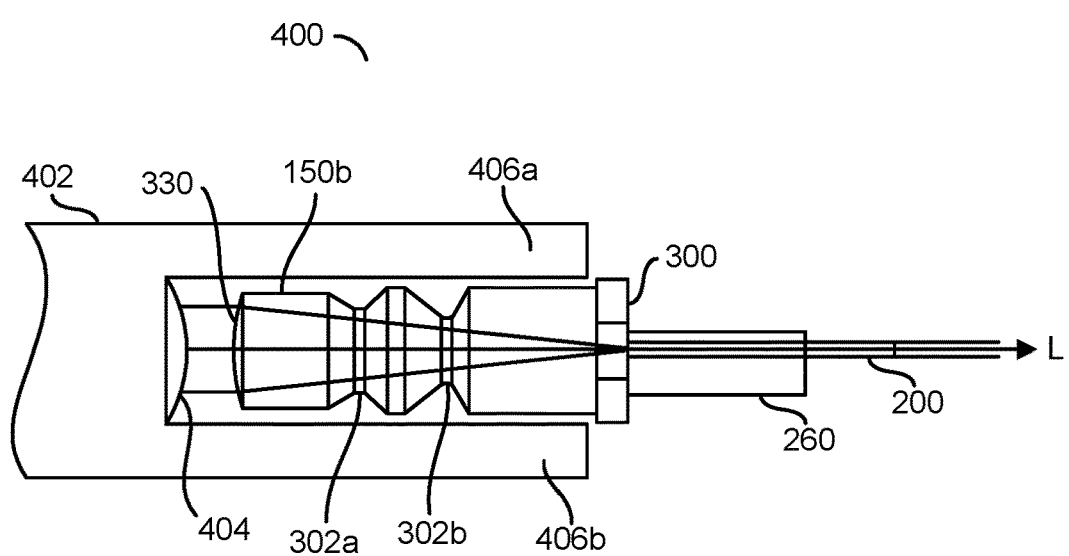
FIG. 9 is a diagram illustrating a fault locator device attached to a light pipe and presenting a light input to the light pipe.

Referring to FIG. 9, a diagram illustrating a fault locator device attached to a light pipe and presenting a light input to the light pipe is shown. A side view 400 of the end 102b of the apparatus 100 is shown. The side view 400 of the end 102b may comprise the light pipe 150b receiving a light input (and implies that the light pipe 150a may emit the light at the other end of the apparatus 100). While the light pipe 150b is shown as a representative example, the description of the light pipe 150b may be similarly applicable to the light pipe 150a receiving the light input.

The side view 400 may comprise the light pipe 150b. The slot features 302a-302b may be implemented by the light pipe 150b. The lens surface 330 is shown at an outer end of the light pipe 150b. The stop surface 300 is shown at an inner end of the light pipe 150b. The tracing fiber 200 is shown against the stop surface 300. The tracing fiber may be glued to the v-groove 260. The v-groove 260 may be molded to the stop surface 300.

A device 402 is shown attached to the light pipe 150b. The device 402 may implement a fault locator. The fault locator 402 may comprise a light source 404 and/or a sleeve 406a-406b. The light source 404 may implement a light emitting diode (LED). The light source 404 may be configured to generate a light input (e.g., the signal L) for the apparatus 100. In the example shown, the light source 404 may generate the signal L. The signal L may be focused into the light pipe 150b by the lens surface 330. The light signal L may be focused in the light pipe 150b and transmitted to the tracing fiber 200. The tracing fiber 200 may propagate the light signal L to the other end (e.g., 102a) of the apparatus 100.

The sleeve 406a-406b may be configured to fit over the light pipe 150b. The view 400 may provide a cross-sectional view of the fault locator 402. In the example shown, a portion 406a of the sleeve 406a-406b is shown above the light pipe 150b and a portion 406b of the sleeve 406a-406b is shown below the light pipe 150b. However, the sleeve 406a-406b may surround the light pipe 150b (e.g., above, below and around the sides) to enable the light pipe 150b to fit into the fault locator 402. For example, a technician may use the fault locator 402 to shine the light from the light source 404 into the light pipe 150b so that the light will be emitted at the other end 102a of the apparatus 100 by the light pipe 150a.

The light pipes 150a-150b may be configured to fit into the fault locator 402. The shape of the protrusion of the light pipes 150a-150b from the fan-out kits 120a-120b may enable the light pipes 150a-150b to fit within the sleeve 406a-406b of the fault locator 402. Generally, the fault locator 402 may be an off-the-shelf device. The lens surface 330 may collect the light generated by the light source 404 and focus the light input into the tracing fiber 200. The fault locator 402 may fit onto either one of the light pipes 150a-150b without needing to disconnect the apparatus 100 (e.g., the I/O connectors 122a-122n and/or the I/O connectors 132a-132n may remain connected to the telecommunications hardware 54a-54d).

Figure 10:
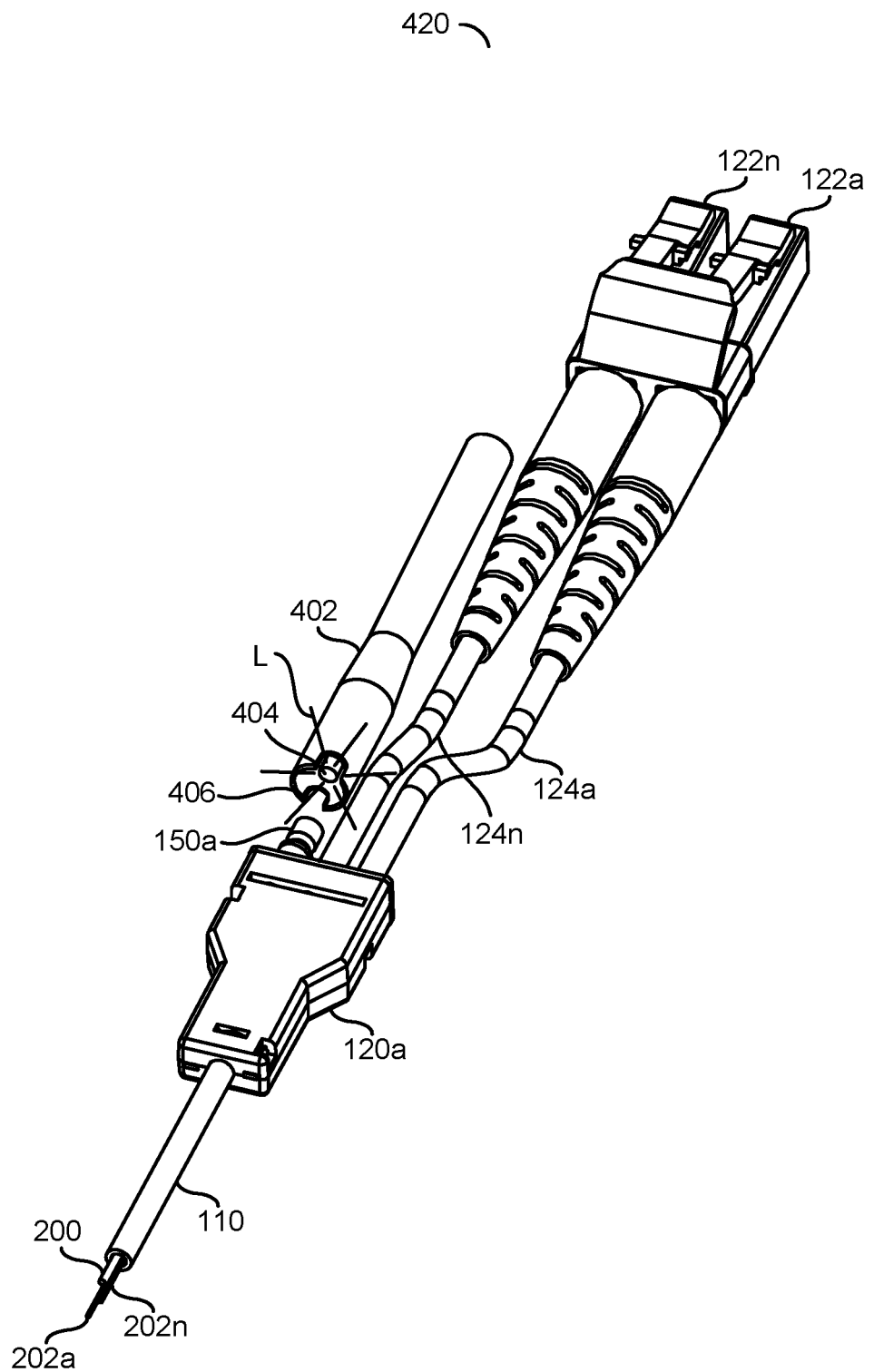
FIG. 10 is a diagram illustrating a fault locator presenting a light input to a light pipe.

Referring to FIG. 10, a diagram illustrating a fault locator presenting a light input to a light pipe is shown. A view 420 is shown. The view 420 may illustrate a view of the end 102a of the apparatus 100. The end 102a is shown as a representative example and the description of the end 102a may be similarly applicable to the end 102b of the apparatus 100.

The cable jacket 110, the fan-out kit 120a and the fault locator 402 are shown in the view 420. The tracing fiber 200, and the data lines 202a-202n are shown within the cable jacket 110. The I/O cable jackets 124a-124n and the light pipe 150a are shown connected to the fan-out kit 120a. The I/O cable jackets 124a-124n may be terminated at the I/O connectors 122a-122n. The fan-out kit 120a shown may be a 2-to-1 fan-out kit.

The light source 404 of the fault locator 402 may be configured to emit the light L. The protrusion of the light pipe 150a may be configured to fit within the fault locator 402. For example, the light pipes 150a-150b may be designed to be small enough to fit within the sleeve 406a-406b of the fault locator 402. The light pipes 150a-150b may protrude a distance long enough to reach the light source 404 within the sleeve 406a-406b of the fault locator 402. The fault locator 402 may be a common tool carried by technicians (e.g., part of an IT technician toolbox).

In the example view 420, the I/O connectors 122a-122n are not shown connected (e.g., not inserted) into one of the hardware modules 54a-54d. The light pipes 150a-150b and the tracing fiber 200 may be used to trace the apparatus 100 regardless of whether the I/O connectors 122a-122n are connected and/or regardless of whether the data lines 202a-202n are transmitting data. In one example, a technician may shine the light L into the light pipe 150a to verify cable installation (e.g., ensure that the data cables are plugged into the correct ports of the telecommunications hardware 54a-54d). The light pipes 150a-150b and the tracing fiber 200 may be used during installation (e.g., while connecting the I/O connectors 122a-122n and the I/O connectors 132a-132n) or after installation (e.g., after the I/O connectors 122a-122n and the I/O connectors 132a-132n have already been connected). In the example shown, the fault locator 402 may be shorter than the length of the I/O cable jackets 124a-124n. With the fault locator 402 shorter than the I/O cable jackets 124a-124n, the fault locator 402 may be easily used while the I/O connectors 122a-122n are plugged into the telecommunications hardware 54a-54d.

In the example shown from the perspective of the view 420, the light pipe 150a may be implemented on a left side of the end of the fan-out kit 120a (e.g., to the left of the I/O cable jackets 124a-124n). In some embodiments, the light pipe 150b may be implemented on a right side of the end of the fan-out kit 120a (e.g., to the right of the I/O cable jackets 124a-124n). In some embodiments, the light pipe 150a may be implemented between the I/O cable jackets 124a-124n. In some embodiments, the light pipe 150a may be implemented on another surface of the fan-out kit 120a. The location of the light pipes 150a-150b on the fan-out kits 120a-120b may be varied according to the design criteria of a particular implementation.

Figure 11:
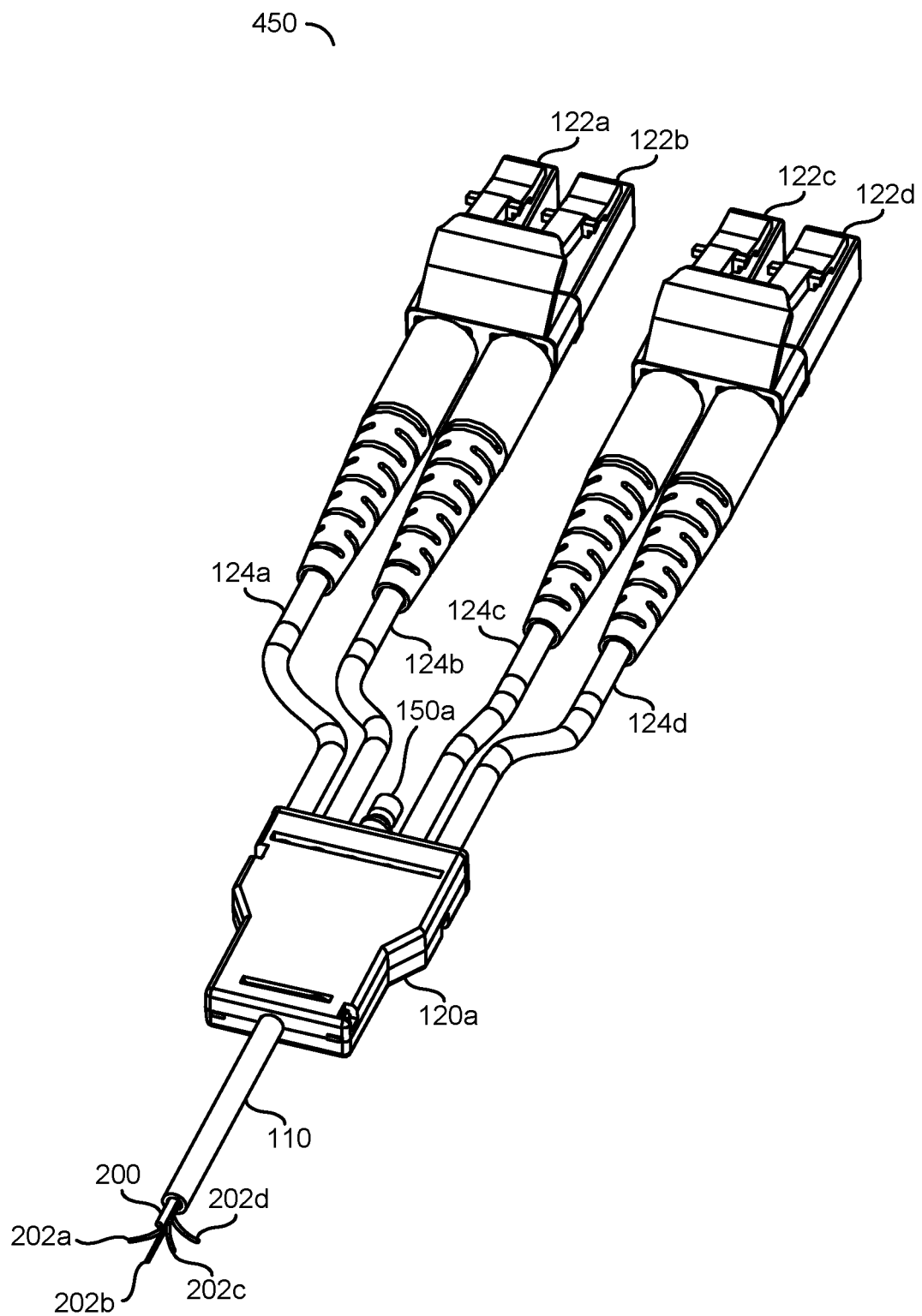
FIG. 11 is a diagram illustrating a fan-out kit with four connectors.

Referring to FIG. 11, a diagram illustrating a fan-out kit with four connectors is shown. A view 450 is shown. The view 450 may illustrate a view of the end 102a of the apparatus 100. The end 102a is shown as a representative example, and the description of the end 102a may be similarly applicable to the end 102b of the apparatus 100.

The cable jacket 110 and the fan-out kit 120a are shown in the view 450. The tracing fiber 200, and the data lines 202a-202d are shown within the cable jacket 110. The I/O cable jackets 124a-124d and the light pipe 150a are shown connected to the fan-out kit 120a. The I/O cable jackets 124a-124d may be terminated at the I/O connectors 122a-122d.

In the example shown, the cable jacket 110 may comprise four of the data lines 202a-202d. The data lines 202a-202d may be bundled with the tracing fiber 200 within the cable jacket 110. The fan-out kit 120a may be configured to separate and route the tracing fiber 200 and the data lines 202a-202d. Within the fan-out kit 120a, the tracing fiber 200 may be routed to the light pipe 150a. Within the fan-out kit 120a, the data line 202a may be routed to the I/O cable jacket 124a, the data line 202b may be routed to the I/O cable jacket 124b, the data line 202c may be routed to the I/O cable jacket 124c and the data line 202d may be routed to the I/O cable jacket 124d. In the example shown, the fan-out kit 120a may implement a 4-to-1 fan-out kit.

The light pipe 150a is shown in the middle of the front surface of the fan-out kit 120a. In the example shown, the light pipe 150a may be in between the I/O cable jackets 124a-124b and the I/O cable jackets 124c-124d. In some embodiments, the light pipe 150a may be implemented in between the I/O cable jacket 124a and the I/O cable jacket 124b. In some embodiments, the light pipe 150a may be implemented between the I/O cable jacket 124c and the I/O cable jacket 124d.

Figure 12:
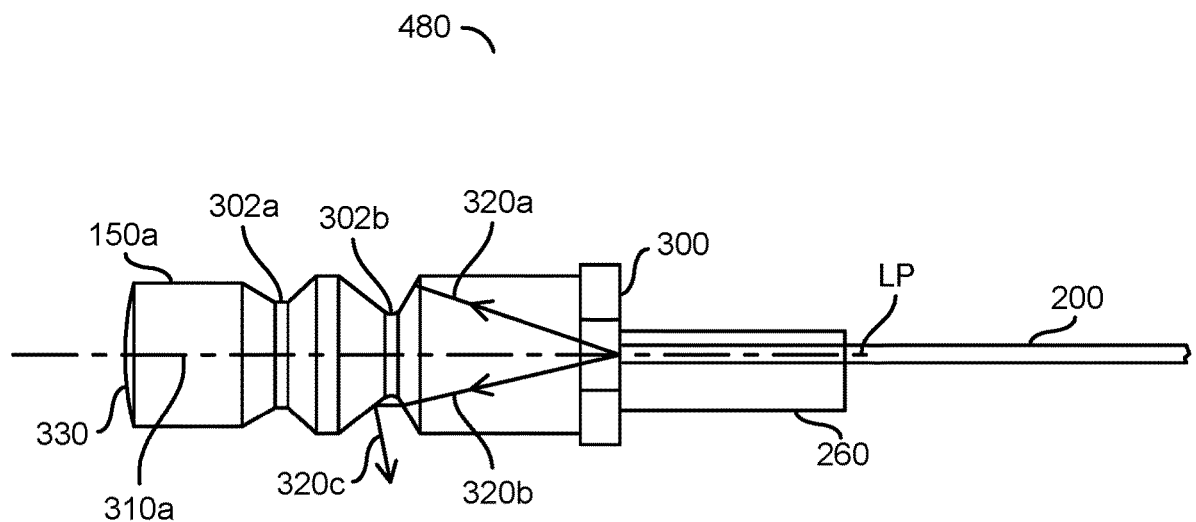
FIG. 12 is a diagram illustrating an example embodiment of a slot feature.

Referring to FIG. 12, a diagram illustrating an example embodiment of a slot feature is shown. A view 480 of a portion of the apparatus 100 is shown. The light pipe 150a is shown at an end of the apparatus 100. The tracing fiber 200 is shown connected to the light pipe 150a (e.g., between the light pipe 150a and the light pipe 150b, not shown). For clarity, the light pipe 150b, the fan-out kits 120a-120b, the I/O connectors 122a-122n, the I/O cable jackets 124a-124n, the I/O connectors 132a-132n and the I/O cable jackets 134a-134n have been omitted. The stop surface 300 is shown perpendicular to the tracing fiber 200. The groove 260 may be attached to the stop surface 300. The tracing fiber 200 is shown routed through the groove 260. The reference line 310a is shown representing a center line of the light pipe 150a. The propagation of light LP is shown from the tracing fiber 200 and into the light pipe 150a (e.g., the light pipe 150a may be an output for the light LP). The lens surface 330 is shown at an end of the light pipe 150a.

The light pipe 150a shown in the view 480 may comprise the slot features 302a-302b with a triangular (or saw tooth) shape. The triangular slot features 302a-302b may be implemented along the perimeter of the light pipe 150a. The light emission 320a-320b is shown extending from the stop surface 300. The light emission 320a-320c may represent the light emitted by the light pipe 150a in response to the light propagation LP. The light emission 320a-320c may be emitted out from the triangular slot features 302a-302b.

The triangular slot features 302a-302b may cause the light to bounce and/or scatter while being emitted from the light pipe 150a. In the example shown, the light emission 320a may be emitted from the slot feature 302b at a diagonal angle. In the example shown, the light emission 320b may be emitted from the slot feature 302b and bounce off the triangular edge of the slot feature 302b. The light emission 320c may represent the bouncing of the light emission 320b. The light emission 320c may be refracted out of the light pipe 150a at different angle than the light emission 320a. Reflecting the light emission 320a-320c at different angles may result in omnidirectional light output that may help technicians trace the cable end of the apparatus 100.

Figure 13:
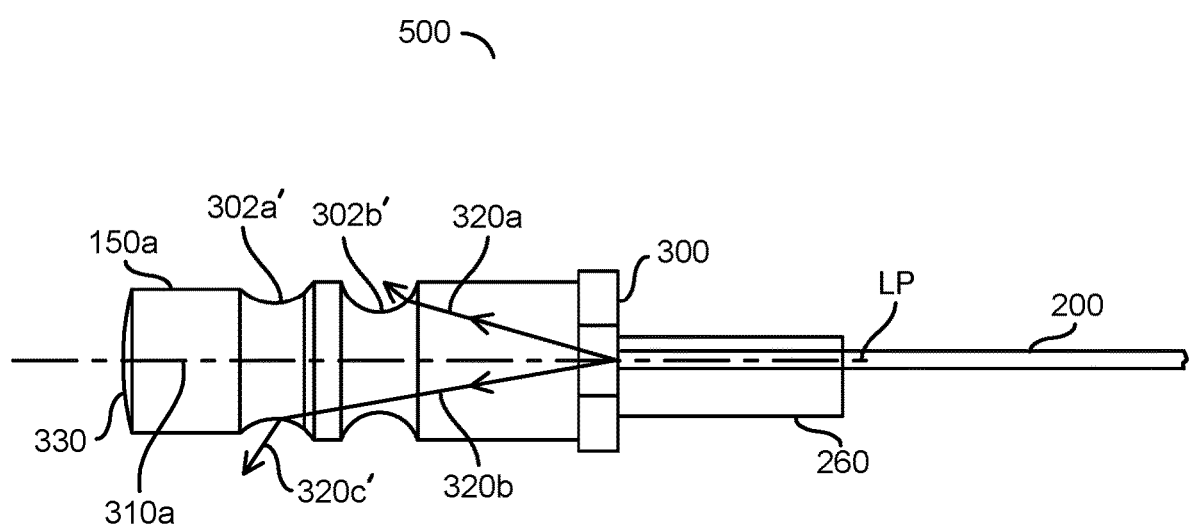
FIG. 13 is a diagram illustrating an example embodiment of a circular slot feature.

Referring to FIG. 13, a diagram illustrating an example embodiment of a circular slot feature is shown. A view 500 of a portion of the apparatus 100 is shown. The light pipe 150a is shown at an end of the apparatus 100. The tracing fiber 200 is shown connected to the light pipe 150a (e.g., between the light pipe 150a and the light pipe 150b, not shown). For clarity, the light pipe 150b, the fan-out kits 120a-120b, the I/O connectors 122a-122n, the I/O cable jackets 124a-124n, the I/O connectors 132a-132n and the I/O cable jackets 134a-134n have been omitted. The stop surface 300 is shown perpendicular to the tracing fiber 200. The groove 260 may be attached the stop surface 300. The tracing fiber 200 is shown routed through the groove 260. The reference line 310a is shown representing a center line of the light pipe 150a. The propagation of light LP is shown from the tracing fiber 200 and into the light pipe 150a (e.g., the light pipe 150a may be an output for the light LP). The lens surface 330 is shown at an end of the light pipe 150a.

The light pipe 150a shown in the view 500 may comprise the slot features 302a'-302b' with a rounded (or circular) shape. The circular slot features 302a'-302b' may be implemented along the perimeter of the light pipe 150a. The light emission 320a-320b is shown extending from the stop surface 300. The light emission 320a-320b and 320c' may represent the light emitted by the light pipe 150a in response to the light propagation LP. The light emission 320a-320b and 320c' may be emitted out from the circular slot features 302a'-302b'.

The circular slot features 302a'-302b' may cause the light to bounce and/or scatter while being emitted from the light pipe 150a. In the example shown, the light emission 320a may be emitted from the slot feature 302b' at a diagonal angle that may be slightly redirected by the circular slot feature 302b'. In the example shown, the light emission 320b may pass beyond the circular slot feature 302b' and be emitted from the slot feature 302a'. The light emission 320c' may represent the reflection of the light emission 320b resulting from the circular slot feature 302a'. The light emission 320c' may be refracted out of the light pipe 150a at different angle than the light emission 320a. Compared to the light emission 320c emitted from the light pipe 150a shown in the view 480 in FIG. 12, the light emission 320c' may reflect in a different direction. Reflecting the light emission 320a-320b and 320c' at different angles may result in omnidirectional light output that may help technicians trace the cable end of the apparatus 100.

Figure 14:
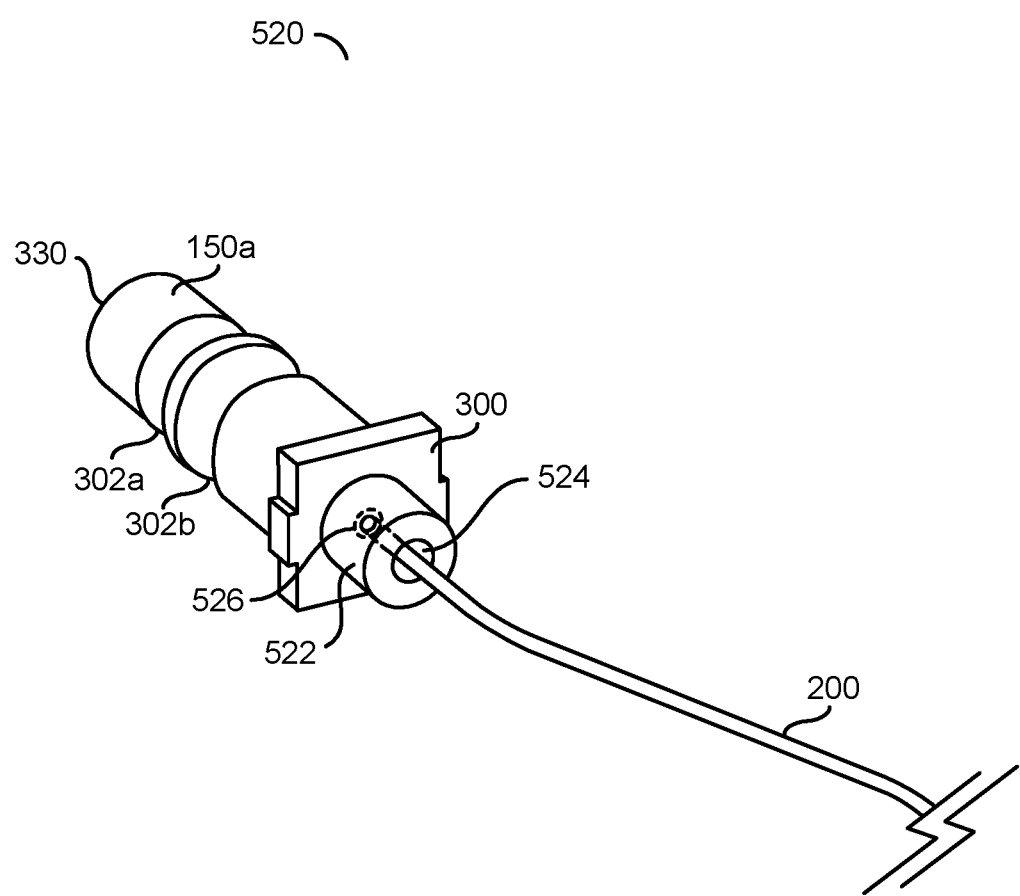
FIG. 14 is a diagram illustrating a tracing fiber terminated using a blind hole.

Referring to FIG. 14, a diagram illustrating a tracing fiber terminated using a blind hole is shown. A view 520 of the end 102a is shown. The view 520 may comprise the light pipe 150a connected to the tracing fiber 200. The view 520 may illustrate how the tracing fiber 200 may be attached to the light pipe 150a. While the view 380 provides an example of the light pipe 150a, the end 102b with the light pipe 150b may have a similar implementation.

The slot features 302a-302b are shown implemented by the light pipe 150a. The light pipe 150a may comprise the lens surface 330 at one end (e.g., a front face) and the stop surface 300 at another end (e.g., a back end). The lens surface 330 may focus the input light. The stop surface 300 may be a focal plane where the light input converges. The light may converge at the stop surface 300 and into the tracing fiber 200. The stop surface 300 may serve as a hard stop mechanical position of the tracing fiber 200.

A guide 522 for a blind hole is shown at the stop surface 300. The guide 522 may comprise an opening 524. The tracing fiber 200 may be inserted into the opening 524. A blind hole 526 is shown. The blind hole 526 may be within the opening 524 at the stop surface 300.

The back end of the light pipe 150a may implement the blind hole 526. The blind hole 526 may comprise an opening configured to enable the tracing fiber 200 to fit within. In one example, the tracing fiber 200 may be inserted into the blind hole 526 and attached with glue. The end of the blind hole 526 may be the stop surface 300. The stop surface 300 may be the focal plane where light converges to the tracing fiber 200 that further serves as a hard mechanical stop position of the tracing fiber 200. The blind hole 526 may comprise an alternate to terminating the tracing fiber 200 with the v-groove 260 shown in association with FIG. 8.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a first light pipe comprising a cylindrical exterior surface and a slot, said first light pipe configured to receive light;
    a second light pipe comprising a cylindrical exterior surface and a slot, said second light pipe configured to emit said light; and
    a tracing fiber configured to propagate said light from said first light pipe to said second light pipe, wherein
        (i) said first light pipe focuses said light by refraction into said tracing fiber,
        (ii) said slot of said second light pipe is (a) implemented along a perimeter of said cylindrical exterior surface and (b) configured to scatter said light outward from around said perimeter of said cylindrical exterior surface of said second light pipe,
        (iii) said tracing fiber is bundled with one or more data carrying lines in a cable,
        (iv) each of said data carrying lines are configured to enable a communication of data, and
        (v) said tracing fiber is configured to propagate said light without interrupting said communication of data,
        (vi) said slot is configured to enable a fault locator device to fit over said first light pipe, and
        (vii) said fault locator device is configured to generate said light.

2. The apparatus according to claim 1, wherein said slot of said first light pipe and said slot of said second light pipe each comprise a circular shape and said circular shape reflects said light to scatter said light outward from around said perimeter of said cylindrical exterior surface.

3. The apparatus according to claim 1, wherein said slot of said first light pipe and said slot of said second light pipe each comprise a triangular shape and said light is configured to reflect off of said triangular shape when passing through said slot to scatter said light outward from around said perimeter of said cylindrical exterior surface.

4. The apparatus according to claim 1, wherein said slot of said first light pipe and said slot of said second light pipe each comprise a square shape.

5. The apparatus according to claim 1, wherein said cylindrical exterior surface of said first light pipe and said cylindrical exterior surface of said second light pipe are each frosted to scatter said light to enable said light to be emitted outward from around said perimeter of said cylindrical exterior surface.

6. The apparatus according to claim 1, wherein
    (i) said first light pipe protrudes from a first fan-out kit,
    (ii) said second light pipe protrudes from a second fan-out kit,
    (iii) said tracing fiber is connected between said first fan-out kit and said second fan-out kit,
    (iv) a first side of said first fan-out kit is connected to a first end of said cable and a first side of said second fan-out kit is connected to a second end of said cable,
    (v) said first light pipe extends from a second side of said first fan-out kit in a direction opposite to said first side of said first fan-out kit and
    (vi) said second light pipe extends from a second side of said second fan-out kit in a direction opposite to said first side of said second fan-out kit.

7. The apparatus according to claim 6, wherein
    (i) said first fan-out kit and said second fan-out kit are each configured to route said data carrying lines to input/output connectors,
    (ii) said first light pipe, said second light pipe and said tracing fiber operate independent from said input/output connectors and said data carrying lines,
    (iii) a first of said input/output connectors extends from said second side of said first fan-out kit in said direction opposite to said first side of said first fan-out kit and
    (iv) a second of said input/output connectors extends from said second side of said second fan-out kit in said direction opposite to said first side of said second fan-out kit.

8. The apparatus according to claim 1, wherein emitting said light from said second light pipe provides an indication of a location of an end of said cable.

9. The apparatus according to claim 1, wherein (i) a first plurality of slots is implemented along a perimeter of said cylindrical exterior surface of said first light pipe and (ii) a second plurality of slots is implemented along said perimeter of said cylindrical exterior surface of said second light pipe.

10. An apparatus comprising:
    a light pipe comprising a cylindrical exterior surface and configured to receive light at a front end and emit said light from said cylindrical exterior surface;
    a tracing fiber configured to propagate said light; and
    a blind hole located at a back end of said light pipe and configured to terminate said tracing fiber at a stop surface of said light pipe, wherein
        (i) said light pipe is configured to focus said light by refraction into said tracing fiber,
        (ii) said stop surface comprises a focal plane where said light converges to said tracing fiber,
        (iii) said tracing fiber is bundled with one or more data carrying lines in a cable,
        (iv) each of said data carrying lines are configured to enable a communication of data,
        (v) said tracing fiber is configured to propagate said light without interrupting said communication of data and
        (vi) said front end of said light pipe faces a direction opposite to said back end of said light pipe.

11. The apparatus according to claim 10, wherein said tracing fiber is configured to be inserted into said blind hole and attached with glue.

12. The apparatus according to claim 10, wherein said stop surface is configured to implement a hard mechanical stop position of said tracing fiber.

13. The apparatus according to claim 10, further comprising a second light pipe comprising a cylindrical exterior surface and a slot, wherein said slot of said second light pipe is configured to scatter said light received from said light pipe to emit said light outward from around a perimeter of said cylindrical exterior surface of said second light pipe.

14. The apparatus according to claim 13, wherein said light pipe and said second light pipe are configured to enable tracing both ends of said cable using said light.

15. The apparatus according to claim 14, wherein (i) said apparatus is implemented in a data center comprising a plurality of cables and (ii) tracing both ends of said cable using said light enables distinguishing said apparatus from said plurality of cables.

16. The apparatus according to claim 10, wherein said data carrying lines comprise at least one of an optical fiber or a wire.

17. The apparatus according to claim 10, wherein said tracing fiber comprises a plastic fiber.

18. The apparatus according to claim 10, wherein said tracing fiber comprises a glass fiber.

19. The apparatus according to claim 10, further comprising a fan-out kit connected to a first end of said cable, wherein (a) said fan-out kit is configured to (i) separate said tracing fiber from said data carrying lines and (ii) provide a path for each of said data carrying lines to connect to one of a plurality of connectors and (b) said front end of said light pipe is configured to protrude from said fan-out kit from a side of said fan-out kit opposite to a second side of said fan-out kit that is connected to said cable.

20. An apparatus comprising:
 a first light pipe comprising a cylindrical exterior surface and a slot, said first light pipe configured to receive light;
 a second light pipe comprising a cylindrical exterior surface and a slot, said second light pipe configured to emit said light; and
 a tracing fiber configured to propagate said light from said first light pipe to said second light pipe, wherein
  (i) said first light pipe focuses said light by refraction into said tracing fiber,
  (ii) said slot of said second light pipe is (a) implemented along a perimeter of said cylindrical exterior surface and (b) configured to scatter said light outward from around said perimeter of said cylindrical exterior surface of said second light pipe,
  (iii) said tracing fiber is bundled with one or more data carrying lines in a cable,
  (iv) each of said data carrying lines are configured to enable a communication of data,
  (v) said tracing fiber is configured to propagate said light without interrupting said communication of data,
  (vi) said first light pipe protrudes from a first fan-out kit,
  (vii) said second light pipe protrudes from a second fan-out kit,
  (viii) said tracing fiber is connected between said first fan-out kit and said second fan-out kit,
  (ix) a first side of said first fan-out kit is connected to a first end of said cable and a first side of said second fan-out kit is connected to a second end of said cable,
  (x) said first light pipe extends from a second side of said first fan-out kit in a direction opposite to said first side of said first fan-out kit, and
  (xi) said second light pipe extends from a second side of said second fan-out kit in a direction opposite to said first side of said second fan-out kit.

* * * * *